United States Patent Office 3,542,766
Patented Nov. 24, 1970

3,542,766
RESOLUTION OF α-AMINOCAPROLACTAM AND N-CARBAMOYL-VALINE
Jiro Ohnogi, Kyoto-fu, and Keijiro Shibata, Chikara Hongo, and Masataka Shibasaki, Osaka-fu, Japan, assignors to Tanabe Seiyaku Co., Ltd., Osaka, Japan, a corporation of Japan
No Drawing. Filed Feb. 9, 1968, Ser. No. 704,232
Claims priority, application Japan, Feb. 16, 1967, 42/9,967
Int. Cl. C07d 41/06
U.S. Cl. 260—239.3                     1 Claim

ABSTRACT OF THE DISCLOSURE

A method for the resolution of DL-α-aminocaprolactam and N-carbamoyl-DL-valine wherein an enantiomer of one of the above two compounds is used as resolving agent for the racemic mixture of the other one, and the resultant diastereoisomers of optically active salts consisting of enantiomers of α-aminocaprolactam and N-carbamoyl-valine are separated from each other by selective crystallization.

---

This invention relates to the resolution of α-aminocaprolactam and N-carbamoyl-valine. More particularly, it relates to a novel and an improved process for resolving DL-α-aminocaprolactam and N-carbamoyl-DL-valine in the form of optically active salt of said compounds.

Among the enantiomers of lysine and valine, the essential components having nutritional value are naturally occuring L-lysine and L-valine. There has been known some methods for resolving synthetic DL-lysine or DL-valine into their optically active components. However, they were not satisfactory in terms of commercial scale resolution, because of such disadvantages as the use of expensive resolving agent, complicacy of the procedures, etc.

It may be apparently more advantageous if the racemic intermediate for the synthesis of said amino acids could be resolved into its optically active components before converting it to the amino acids.

As results of various investigations in this respect, we have found that enantiomers of the one of α-aminocaprolactam and N-carbamoyl-valine may form an optically active salt with the other as a diastereoisomer. In view of this finding, we have established an improved method which is suitable for the commercial scale resolution of both compounds in which an optically active isomer of one of the above two compounds is utilized as the resolving agent for the other and the resulting diastereaisomers are separated efficiently from each other by selective crystallization.

According to the present invention, DL-α-aminocaprolactam and N-carbamoyl-DL-valine can be resolved efficiently into their optically active components in good yield by the process, which comprises reacting an enantiomer of one of the above two compounds with an racemic mixture of the other in a preferable solvent, separating the resultant optically active salts as diastereoisomers by selective crystallization and recovering each enantiomers from the separated diastereoisomers.

For example, DL-α-aminocaprolactam can be resolved into D-α-aminocaprolactam and L-α-aminocaprolactam by the process, which comprises reacting an enantiomer of N-carbamoyl-valine with DL-α-aminocaprolactam in a preferable solvent, separating the resultant optically active α-aminocaprolactam, N-carbamoyl-valinate from its diastereoisomer by selective crystallization and recovering optically active components of α-aminocaprolactam from the separated diastereoisomers. On the other hand, N-carbamoyl-DL-valine can be resolved into N-carbamoyl-D-valine and N-carbamoyl-L-valine by the process, which comprises reacting an enantiomer of α-aminocaprolactam with N-carbamoyl-DL-valine in a preferable solvent, separating the resultant optically active α-aminocaprolactam, N-carbamoyl-valinate from its diastereoisomer by selective crystallization and recovering optically active components of N-carbamoyl-valine from the separated diastereoisomers. The diastereoisomers formed in the process of the present invention are as follows:

D-α-aminocaprolactam-N-carbamoyl-L-valinate

Specific rotation: $[\alpha]_D^{20} = -23.1°$ (C=2, $H_2O$)
Molecular rotation: $[M]_D^{20} = +66.5°$
Decomposing point: 223° C.
Solubility: 12.0 g./100 g. of water (at 30° C.)

L-α-aminocaprolactam. N-carbamoyl-D-valinate

Specific rotation: $[\alpha]_D^{20} = -23.1°$ (C=2, $H_2O$)
Molecular rotation: $[M]_D^{20} = -66.5°$
Decomposing point: 223° C.
Solubility: 12.0 g./100 g. of water (at 30° C.)

L-α-aminocaprolactam. N-carbamoyl-L-valinate

Specific rotation: $[\alpha]_D^{20} = -4.7°$ (C=2, $H_2O$)
Molecular rotation: $[M]_D^{20} = -13.5°$
Decomposing point: 197° C.
Solubility: 81.3 g./100 g. of water (at 30° C.)

D-α-aminocaprolactam. N-carbamoyl-D-valinate

Specific rotation: $[\alpha]_D^{20} = +4.7°$ (C=2, $H_2O$)
Molecular rotation: $[M]_D^{20} = +13.5°$
Decomposing point: 197° C.
Solubility: 81.3 g./100 g. of water (at 30° C.)

Any one of optically active enantiomers of α-aminocaprolactam and N-cargamoyl-valine can be used as resolving agent in the present resolution method. Namely, when D-α-aminocaprolactam is reacted with N-carbamoyl-DL-valine in an aqueous solution, D-α-aminocaprolactam. N-carbamoyl-L-valinate and D-α-aminocaprolactam. N-carbamoyl-D-valinate are formed and the former diastereoisomer is crystallized out selectively from the reaction mixture. Similarly, when L-α-aminocaprolactam is reacted with N-carbamoyl-DL-valine in an aqueous solution, L-α-aminocaprolactam. N-carbamoyl-D-valinate and L-α-aminocaprolactam. N-carbmoyl-L-valinate are formed and the former diastereoisomer is crystallized out selectively from the reaction mixture.

Against this, when N-carbamoyl-D-valine is reacted with DL-α-aminocaprolactam in an aqueous solution, L-α-aminocaprolactam. N-carbamoyl-D-valinate and D-α-aminocaprolactam. N-carbamoyl-D-valinate are formed and the former diastereoisomer is crystallized out selectively from the reaction mixture. Similarly, when N-carbamoyl-L-valine is reacted with DL-α-aminocaprolactam in an aqueous solution, D-α-aminocaprolactam. N-carbamoyl-L-valinate and L-α-aminocaprolactam. N-carbamoyl-L-valinate are formed and the former diastereoisomer is crystallized out selectively from the reaction mixture.

Thus, the crystals of D-α-aminocaprolactam, N-carbamoly-L-valinate and L-a-aminocaprolactam. N-carbamoyl-D-valinate can be separated respectively in optically pure form usually at a resolution ratio not less than 90% of theory, since the solubilities of the salts are much smaller than their disastereoisomers.

The selective crystallization is progressed efficiently by cooling or concentrating the reaction mixture. It is also effective to add an organic solvent which will reduce the solubility of salts such as methanol, ethanol, isopropanol, acetone, etc. The crystallization is preferably carried out at a temperture between −10° C. and 70° C.

The resolution procedures can be also carried out in any solvents other than water in which the solubility of both diasetereoisomers are sufficiently different from each other; for example, in dimethylformamide.

In a preferable embodiment of the present invention, the resolving agent is used in an amount equimolar to the racemic mixture to be resolved to form equal amounts of two optically active salts, thereby the separation of both diasetreoisomers may be carried out efficiently by the selective crystallization under a suitable condition.

Then, the disatereoisomers thus obtained are treated with an acid to decompose into their enantiomophic components and the components are recovered by conventional manners. For example, the crystals of diastereoisomers are treated with hydrochloric acid at pH about 1.2–1.8 under a moderate condition, thereby N-carbamoyl-D- or -L-valine selectively crystallizes out from the solution in which D- or L-α-aminocaprolactam is dissolving.

In an alternative embodiment of the present invention, the resolution can be carried out using a half of the resolving agent equimolar to the racemic mixture. For example, when 0.5 mole of N-carbamoyl-D-valine is added to an aqueous solution of 1.0 mole of DL-α-aminocaprolactam, 0.5 mole of L-α-aminocaprolactam, N-carbamoyl-D-valinate can be crystallized out selectively from the solution in which 0.5 mole D-α-aminocaprolactam is dissolving. Then, L-α-aminocaprolactam can be recovered by decomposing the crystal and its antipode can be isolated from the mother liquor. In this modification, when D-α-aminocaprolactam or L-α-aminocaprolactam is used as the resolving agent for the racemic N-carbamoyl-valine, excess amounts of N-carbamoyl-valine to the aminocaprolactam may be separated in the form of a soluble alkali salt.

It is also possible to use the resolving agent in a larger amount than the equimolar amount to the racemic mixture, if the resolving agent is D- or L-α-aminocaprolacinate or L-α-aminocaprolactam. N-carbamoyl-L-valinate. In this case, an excess amount of the resolving agent remains dissolved in the mother liquor when the selective crystallization of an optically active salt is carried out. Therefore, it does not cause the contamination of crystals.

Furthermore, within the scope of the present invention, enantiomers of α-aminocaprolactam and N-carbamoyl-valine can be replaced by their salt in some cases when said salt is D-α-aminocaprolactam. N-carbamoyl-D-valinate or L-α-aminocaprolactam. N-carbomyl-L-valinate. Such modification is conveniently applied to the mother liquor of the selective crystallization as encountered hereafter in Example 2 and 7.

When the crystallization is exceeded beyond the limit, the resulting crystals of a diastereoisomers can be readily purified by extracting the contaminated antipode with an amount of water just sufficient to dissolve said antipode.

From the mother liquor in which D-α-aminocaprolactam. N-carbamoyl-D-valinate or L-α-aminocaprolactam. N-carbamoyl-L-valinate is disoslving, their optically active components can be recovered by conventional manners as described hereinbefore. Alternatively, if the mother liquor is treated with a strongly acidic cation- exchange resin ($NH_4$ type ), D- or L-α-aminocaprolactam is absorbed on the resin, while N-carbamoyl-D- or -L-valine is converted their ammonium salt and will not absorb on the resin.

In the present method, it is possible to use the alkaline salt of N-carbamoyl-D- or -L-valine as the resolving agent; for example, an amine salt such as ammonium salt or methylamine salt, or an alkali metal salt such as potassium salt, or sodium salt. Similarly, acid addition salts of D- or L-α-aminocaprolactam with organic acids or inorganic acids are also employable as the resolving agent.

EXAMPLE 1

12.8 g. of DL-α-aminocaprolactam is dissolved in 100 ml. of water and 16.0 g. of N-carbamoyl-L-valine is dissolved in the solution at 70° C. The solution is then allowed to stand for 6 hours at 0° C., and the resultant crystals are collected by filtration. The crystals are washed with 5 ml. of water and dried whereby 7.80 g. of D-L-aminocaprolactam-N-carbamoyl-L-valinate is obtained as white crystals.

The mother liquor is incorporated with the washing of the crystal and concentrated under reduced pressure until the volume of the remaining liquid phase becomes 30 ml. After cooling the concentrate at 10° C. for 5 minutes, the resultant crystals are washed with 5 ml. of water and dried whereby additional 6.15 g. of D-α-aminacaprolactam-N-carbamoyl-L-valinate is obtained.

Total yield of the compound: 13.95 g.
Decompose at 223° C.
Specific rotation: $[\alpha]_D^{20} = +23.0°$ (C=2, $H_2O$)
Molecular rotation: $[M]_D^{20} = +66.3°$
Optical purity: 99.8%.
Resolution ratio: 96.6%

Resolution ratio =

$$\frac{\text{Actual yield of the diastereoisomer calculated as optically pure substance}}{\text{Theoretical yield of the diastereoisomer}} \times 100$$

13.9 g. of the crystals of D-α-aminocaprolactam-N-carbamoyl-L-valinate are dissolved in 120 ml. of water. The solution is acidified with 20 ml. of concentrated hydrochloric acid under cooling with water and is allowed to stand for 2 hours at 10° C. The resulting crystals are collected by filtration and dried whereby 7.2 g. of N-carbamoyl-L-valine is obtained.

Yield: 93.3%
Decompose at 203.5° C.
Specific rotation: $[\alpha]_D^{20} = +14.0$ (C=10, N—NaOH)
Optical purity: 98.6%

The mother liquor separated from the crystals of N-carbamoyl-L-valine is passed through a column of 120 ml. of a weakly basic anion-exchange resin (OH type) and the passed solution is concentrated under reduced pressure until the volume of the remaining liquid phase becomes 5 ml. 25 ml. of ethanol is added to the concentrate and the resulting crystals are collected by filtration. The crystals are washed with ethanol and dried whereby 7.7 g. of D-α-aminocaprolactam hydrochloride is obtained.

Decompose at 291–292° C.
Specific rotation: $[\alpha]_D^{20} = +28.5°$ (C=2, $H_2O$)

Nitrogen content.—Calculated (percent): 17.43. Found (percent): 17.26.

Optical purity: 100%

The mother liquor, which dissolving L-α-aminocaprolactam. N-carbamoyl-L-valinate, separated from the crystals of D-α-aminocaprolactam. N-carbamoyl-L-valinate is diluted with 150 ml. of water. The solution is passed through a column of 50 ml. of a strongly acidic cation-exchange resin (ammonium type). The passed solution is concentrated under reduced pressure to give 8.8 g. of ammonium N-carbamoyl-L-valinate.

The resin is eluted with 150 ml. of 5% aqueous ammonia and the eluate is evaporated to dryness under reduced prsesure. After adding 20 ml. of water, the residue is cooled with ice and neutralized with 8.5 g. of 47% hydrobromic acid. 50 ml. of methanol is added in portionwise to the solution and the resultant crystals are collected by filtration. The crystals are washed with 5 ml.

of methanol whereby 9.1 g. of L-α-aminocaprolactam hydrobromide is obtained as colorless prisms.

Yield: 87.2% (based upon DL-α-aminocaprolactam)
Decompose at 285–288° C.
Specific rotation: $[\alpha]_D^{20} = -20.7°$ (C=5, $H_2O$)

Elemental analysis.—Calculated (percent): C, 34.46; H, 6.27; N, 13.40; Br, 38.22. Found (percent): C, 34.72; H, 6.08; N, 13.25; Br, 37.97.

Optical purity: 100%

EXAMPLE 2

25.6 g. of DL-α-aminocaprolactam and 17.6 g. of N-carbamoyl-D-valine are dissolved in 100 ml. of water at 70° C. The solution is concentrated under reduced pressure until the volume of the remaining liquid phase becomes 20 ml. After adding 70 ml. of methanol, the concentrate is stirred at room temperature for 10 minutes. The resulting crystals are collected by filtration, washed with 10 ml. of methanol and dried whereby 29.0 g. of L-α-aminocaprolactam. N-carbamoyl-D-valinate is obtained as crystals.

Decompose at 223° C.
Specific rotation: $[\alpha]_D^{20} = -22.9°$ (C=2, $H_2O$)
Molecular rotation: $[M]_D^{20} = -66.1°$
Optical purity: 99.5%
Resolution ratio: 100%

29.0 g. of hte crystals of L-α-aminocaprolactam. N-carbamoyl-D-valinate are dissolved in 250 ml. of water. The solution is acidified with 40 ml. of concentrated hydrochloric acid under cooling with water, and is allowed to stand for 2 hours at 10° C. The resulting crystals are collected by filtration and dried whereby 15.2 g. of N-carbamoyl-D-valine is obtained.

Specific rotation: $[\alpha]_D^{20} = 14.0°$ (C=10, N—NaOH)

The mother liquor separated from the crystals of N-carbamoyl-D-valine is passed through a column of 250 ml. of a weakly basic anion-exchange resin (OH type) and the passed solution is concentrated under reduced pressure until the volume of the remaining liquid phase becomes 10 ml. 50 ml. of ethanol is added to the concentrate and the resulting crystals are collected by filtration. The crystals are washed with ethanol and dried whereby 16.2 g. of L-α-aminocaprolactam hydrochloride is obtained.

Yield: 98.5%
Decompose at 291–292° C.
Specific rotation: $[\alpha]_D^{20} = -28.5°$ (C=2, $H_2O$)

Nitrogen content.—Calculated (percent): 17.43. Found (percent): 17.21.

Optical purity: 100%

The mother liquor which dissolving D-α-aminocaprolactam. N-carbamoyl-D-valinate separated from the crystals of L-α-aminocaprolactam. N-carbamoyl-D-valinate is incorporated with the washing of the crystals and is evaporated to dryness under reduced pressure. 300 ml. of water, 30.4 g. of N-carbamoyl-DL-valine and 100 ml. of 1N-aqueous solution of sodium hydroxide are added to the residue thereby forming a solution of pH 6.2. The solution is concentrated under reduced pressure until the volume of the remaining liquid phase becomes 65 ml. and the resulting crystals are collected by filtration. The crystals are washed wtih methanol and dried whereby 25.5 g. of D-α-aminocaprolactam. N-carbamoyl-L-valinate is obtained.

Decompose at 222° C.
Specific rotation: $[\alpha]_D^{20} = +21.0°$ (C=2, $H_2O$)
Molecular rotation: $[M]_D^{20} = +60.6°$
Optical purity: 89.0%
Resolution ratio: 83.8%

The mother liquor separated from the crystals of D-α-aminocaprolactam. N-carbamoyl-L-valinate is concentrated under reduced pressure until the volume of the remaining liquid phase becomes 50 ml. and the concentrate is adjusted to pH 1.2 by adding 15 ml. of concentrated hydrochloric acid. The resulting crystals are collected by filtration and dried whereby 15.0 g. of N-carbamoyl-D-valine is obtained.

Specific rotation: $[\alpha]_D^{20} = -14.1°$ (C=10, N—NaOH)
Optical purity: 99.4%
Resolution ratio: 98.2%

EXAMPLE 3

12.8 g. of DL-α-aminocaprolactam and 12.0 g. of N-carbamoyl-L-valine are dissolved in 100 ml. of water at 60° C. The solution is concentrated under reduced pressure until the volume of the remaining liquid phase becomes 30 ml. and is cooled down to room temperature. The resulting crystals are collected by filtration, washed with 5 ml. of methanol and dried whereby 12.2 g. of D-α-aminocaprolactam. N-carbamoyl-L-valinate is obtained.

Decompose at 221° C.
Specific rotation: $[\alpha]_D^{20} = +22.4°$ (C=2, $H_2O$)
Molecular rotation: $[M]_D^{20} = +64.6°$
Optical purity: 97.7%
Resolution ratio: 82.8%

The crystals are dissolved in 100 ml. of water at 50° C. and the solution is concentrated under reduced pressure until the volume of the remaining liquid phase becomes 10 ml. The resulting crystals are collected by filtration, washed with 10 ml. of methanol and dried whereby 11.5 g. of purified crystals of D-α-aminocaprolactam. N-carbamoyl-L-valinate is recovered.

Specific rotation: $[\alpha]_D^{20} = +23.1°$ (C=2, $H_2O$)
Molecular rotation: $[M]_D^{20} = +66.5°$
Optical purity: 100%

EXAMPLE 4

12.8 g. of DL-α-aminocaprolactam and 8.0 g. of N-carbamoyl-D-valine are dissolved in 40 ml. of water at 70° C. The solution is evaporated to dryness under reduced pressure and 50 ml. of methanol is added to the residue. The resulting crystals are collected by filtration, washed twice with each 5 ml. of methanol and dried whereby 11.9 g. of L-α-aminocaprolactam. N-carbamoyl-D-valinate is obtained.

Decompose at 223° C.
Specific rotation: $[\alpha]_D^{20} = -22.5°$ (C=2, $H_2O$)
Molecular rotation: $[M]_D^{20} = -65.0°$
Optical purity: 98.2%
Resolution ratio: 81.3%

The mother liquor separated from the crystals and the washing of the crystals are incorporated and evaporated to remove methanol whereby 7.6 g. of crude D-α-aminocaprolactam is obtained.

EXAMPLE 5

12.8 g. of DL-α-aminocaprolactam is dissolved in 350 ml. of an aqueous solution containing 17.7 g. of ammonium N-carbamoyl-L-valinate. The solution is concentrated under reduced pressure until the volume of the remaining liquid phase becomes 20 ml. and 30 ml. of methanol is added to the concentrate. The resulting crystals are collected by filtration and dried whereby 14.0 g. of D-α-aminocaprolactam. N-carbamoyl-L-valinate is obtained as white crystals.

Decompose at 224° C.
Specific rotation: $[\alpha]_D^{20} = +23.0°$ (C=2, $H_2O$)
Molecular rotation: $[M]_D^{20} = +66.3°$
Optical purity: 99.8%
Resolution ratio: 97.2%

Nitrogen content.—Calculated (percent): 19.42. Found (percent): 19.28.

EXAMPLE 6

12.8 g. of DL-α-aminocaprolactam and 17.7 g. of ammonium N-carbamoyl-L-valinate are dissolved in 40 ml. of water under heating and the solution is cooled to 10° C. The resulting crystals are collected by filtration, washed with 5 ml. of water and dried whereby 13.9 g. of D-α-aminocaprolactam. N-carbamoyl-L-valinate is obtained.

Decompose at 223° C.
Specific rotation: $[\alpha]_D^{20} = +22.0°$ (C=2, $H_2O$)
Molecular rotation: $[M]_D^{20} = +63.5°$
Optical purity: 96.4%
Resolution ratio: 91.0%

The mother liquor separated from the crystals and the washing of the crystals are incorporated and concentrated under reduced pressure until the volume of the remaining liquid phase becomes 20 ml. 20 ml. of ethanol is added to the concentrate and the resulting crystals are collected by filtration. The crystals are washed with 15 ml. of methanol and dried whereby additional 0.9 g. of crystals of D-α-aminocaprolactam. N-carbamoyl-L-valinate is obtained.

Specific rotation: $[\alpha]_D^{20} = +22.6°$ (C=2, $H_2O$)
Molecular rotation: $[M]_D^{20} = +60.5°$
Optical purity: 92.5%

The mother liquor separated from the additional crystallization of D-α-aminocaprolactam. N-carbamoyl-L-valinate and the washing of crystals are incorporated and is evaporated to dryness under reduced pressure. After adding 20 ml. of ethanol to the residue, the resulting crystals are collected by filtration, washed with 5 ml. of ethanol and dried. Thus, 11.9 g. of L-α-aminocaprolactam. N-carbamoyl-L-valinate is obtained as white crystals.

Decompose at 197° C.
Specific rotation: $[\alpha]_D^{20} = -4.7°$ (C=2, $H_2O$)
Molecular rotation: $[M]_D^{20} = -13.5°$
Optical purity: 100%
Resolution ratio: 82.7%

EXAMPLE 7

8 g. of N-carbamoyl-DL-valine and 6.4 g. of L-α-aminocaprolactam are dissolved in 100 ml. of water. The solution is concentrated under reduced pressure until the volume of the remaining liquid phase becomes 35 ml. and the concentrate is allowed to stand for 2 hours at about 10° C. The resulting crystals are collected by filtration, washed with 5 ml. of methanol and dried whereby 5.7 g. of L-α-aminocaprolactam. N-carbamoyl-D-valinate is obtained.

Decompose at 224° C.
Specific rotation: $[\alpha]_D^{20} = -23.1°$ (C=2, $H_2O$)
Molecular rotation: $[M]_D^{20} = -66.5$
Optical purity: 100%

2.4 g. of L-α-aminocaprolactam and 3 g. of N-carbamoyl-D-valine are dissolved in the mother liquor separated from the above procedures under heating. The solution is allowed to stand at about 10° C. for one hour and the resulting crystals are collected by filtration. The crystals are washed with 5 ml. of methanol and dried whereby 2.4 g. of L-α-aminocaprolactam. N-carbamoyl-D-valinate is obtained.

Decompose at 223° C.
Specific rotation: $[\alpha]_D^{20} = -228°$ (C=2, $H_2O$)
Molecular rotation: $[M]_D^{20} = -65.7°$
Optical purity: 98.4%

EXAMPLE 8

8.0 g. of N-carbamoyl-DL-valine, 8.8 g. of ammonium N-carbamoyl-DL-valinate and 6.4 g. of L-α-aminocaprolactam are dissolved in 65 ml. of water. The solution is concentrated under reduced pressure until the volume of the remaining liquid phase becomes 30 ml. and the concentrate is cooled down to room temperature. The resulting crystals are collected by filtration, washed with 5 ml. of methanol and dried whereby 9.3 g. of L-α-aminocaprolactam. N-carbamoyl-D-valinate is obtained.

Decompose at 218° C.
Specific rotation: $[\alpha]_D^{20} = -18.7°$ (C=2, $H_2O$)
Molecular rotation: $[M]_D^{20} = -54.0°$
Optical purity: 76.4%

EXAMPLE 9

8 g. of N-carbamoyl-DL-valine and 6.4 g. or D-α-aminocaprolactum are dissolved in 100 ml. of water. The solution is concentrated under reduced pressure until the volume of the remaining liquid phase becomes 35 ml. and the concentrate is allowed to stand for 2 hours at about 10° C. The resulting crystals are collected by filtration, washed with 5 ml. of methanol and dried whereby 5.6 g. of D-α-aminocaprolactum. N-carbamoyl-L-valinate is obtained.

Decompose at 224° C.
Specific rotation: $[\alpha]_D^{20} = +23.1°$ (C=2, $H_2O$)
Molecular rotation: $[M]_D^{20} = +66.5°$
Optical purity: 100%

The mother liquor which dissolving D-α-aminocaprolactam. N-carbamoyl-D-valinate is diluted with 80 ml. of water. The solution is passed through a column of 25 ml. of a strongly acidic cation-exchange resin (ammonium type). The passed solution is concentrated under reduced pressure to give 4.4 g. of ammonium N-carbamoyl-D-valinate.

Decompose at 186–187° C.
Specific rotation: $[\alpha]_D^{23} = -11.2°$ (C=10, $H_2O$)

The resin is eluted with 80 ml. of 5% aqueous and the elute is evaporated to dryness under reduced pressure. After adding 10 ml. of water, the residue is cooled with ice and neutralized with 4.3 g. of 47% hydrobromic acid. 25 ml. of methanol is added in portionwise to the solution and the resultant crystals are collected by filtration. The crystals are washed with 3 ml. of methanol whereby 4.4 g. of D-α-aminocaprolactam hydrobromide is obtained as colorless prisms.

Specific rotation: $[\alpha]_D 20 = +20.7°$ (C=5, $H_2O$)
Optical purity: 100%

EXAMPLE 10

12.8 g. of DL-α-aminocaprolactam and 17.7 g. of ammonium N-carbamoyl-D-valinate are dissolved in 40 ml. of water under heating and the solution is cooled to 10° C. The resulting crystals are collected by filtration, washed with 5 ml. of water and dried whereby 13.8 g. of L-α-aminocaprolactam. N-carbamoyl-D-valinate is obtained.

Decompose at 223° C.
Specific rotation: $[\alpha]_D 20 = -22.0°$ (C=2, $H_2O$)

The mother liquor separated from the crystals and the washing of crystals are incorporated and concentrated under reduced pressure until the volume of the remaining liquid phase becomes 20 ml. 20 ml. of ethanol is added to the concentrate and the resulting crystals are collected by filtration. The crystals are washed with 15 ml. of methanol and dried whereby additional 0.9 g. of crystals of L-α-aminocaprolactam. N-carbamoyl-D-valinate is obtained.

Specific rotation: $[\alpha]_D^{20} = -22.6°$ (C=2, $H_2O$)

The mother liquor separated from the additional crystallization of L-α-aminocaprolactam. N-carbamoyl-D-valinate and the washing of crystals are incorporated and evaporated to dryness under reduced pressure. After adding 20 ml. of ethanol to the residue, the resulting crystals are collected by filtration, washed with 5 ml. of ethanol and dried. Thus, 11.8 g. of D-α-aminocaprolactam. N-carbamoyl-D-valinate is obtained as white crystals.

Decompose at 197° C.
Specific rotation: $[\alpha]_D^{20} = +4.7°$ (C=2, $H_2O$)
Molecular rotation: $[M]_D^{20} = +13.5°$
Optical purity: 100%
Resolution ratio: 82.0%

What is claimed is:
1. An optically active compound selected from the group consisting of D-α-aminocaprolactam. N-carbamoyl-L-valinate, L-α-aminocaprolactam. N-carbamoyl-D-valinate, D-α-aminocaprolactam. N-carbamoyl-D-valinate, and L-α-aminocaprolactam. N-carbomoyl-L-valinate.

References Cited
UNITED STATES PATENTS 3,275,619   9/1966   Brenner et al. ____ 260—239.3

OTHER REFERENCES

Lippich, "Chem. Berichte," vol. 41, pp. 2953–2963 (1908).

Gilman, "Organic Chemistry," vol. 1, pp. 187–196, Wiley (1938).

HENRY R. JILES, Primary Examiner

R. T. BOND, Assistant Examiner

U.S. Cl. X.R.

260—534, 553, 707